(12) United States Patent
Wang et al.

(10) Patent No.: US 6,489,762 B2
(45) Date of Patent: Dec. 3, 2002

(54) METHOD TO DETECT JUNCTION INDUCED SIGNAL INSTABILITY FROM GMR/MR HEADS

(75) Inventors: Geng Wang, San Jose, CA (US); Zhaohui Li, Santa Clara, CA (US); Hyung Jai Lee, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/844,897

(22) Filed: Apr. 26, 2001

(65) Prior Publication Data

US 2002/0158629 A1 Oct. 31, 2002

(51) Int. Cl.⁷ .......................... G01R 33/12; G11B 5/455
(52) U.S. Cl. ...................................................... 324/210
(58) Field of Search ................................ 324/210, 212; 360/25, 31

(56) References Cited

U.S. PATENT DOCUMENTS

| | | | |
|---|---|---|---|
| 4,813,782 A | 3/1989 | Yagi et al. ................. 356/357 |
| 5,055,969 A | 10/1991 | Putnam ..................... 361/398 |
| 5,122,915 A | 6/1992 | Klein et al. ................ 360/113 |
| 5,233,482 A | 8/1993 | Galbraith et al. ........... 360/46 |
| 5,301,080 A | 4/1994 | Ottesen et al. ............. 360/113 |
| 5,309,295 A | 5/1994 | Bailey et al. .............. 360/66 |
| 5,327,303 A | 7/1994 | Smith ....................... 360/67 |
| 5,335,121 A | 8/1994 | Bombeeck ................. 360/65 |
| 5,367,409 A | 11/1994 | Ottesen et al. ............. 360/32 |
| 5,388,127 A | 2/1995 | Scarpa ...................... 375/376 |
| 5,422,764 A | 6/1995 | McIlvanie ................. 360/97.01 |
| 5,426,542 A | 6/1995 | Smith ....................... 360/67 |
| 5,430,592 A | 7/1995 | Yoda ........................ 360/113 |
| 5,475,488 A | 12/1995 | Fukuzawa et al. .......... 356/357 |
| 5,497,111 A | 3/1996 | Cunningham .............. 327/58 |
| 5,499,161 A | 3/1996 | Hosseinzadeh et al. ..... 361/749 |
| 5,557,399 A | 9/1996 | de Groot ................... 356/357 |
| 5,566,101 A | 10/1996 | Kodra .................... 364/724.16 |
| 5,583,720 A | 12/1996 | Ishida et al. ............. 360/97.01 |
| 5,590,154 A | 12/1996 | Forni et al. ................ 375/229 |
| 5,729,410 A * | 3/1998 | Fontana, Jr. et al. ........ 360/113 |
| 5,737,837 A | 4/1998 | Inaba ........................ 29/884 |
| 5,757,582 A | 5/1998 | White et al. ............. 360/98.01 |
| 5,760,982 A | 6/1998 | Stein ......................... 360/31 |
| 5,781,133 A | 7/1998 | Tsang ........................ 341/59 |
| 5,822,143 A | 10/1998 | Cloke et al. ................ 360/65 |
| 5,844,920 A | 12/1998 | Zook et al. ............... 371/40.14 |
| 5,862,007 A | 1/1999 | Pham et al. ................ 360/65 |
| 5,898,532 A | 4/1999 | Du et al. ................... 360/46 |
| 5,914,594 A | 6/1999 | Mian ........................ 324/210 |
| 5,926,348 A * | 7/1999 | Shouji et al. .............. 360/113 |
| 5,961,658 A | 10/1999 | Reed et al. ................ 714/746 |
| 6,078,473 A | 6/2000 | Crane et al. ............... 360/104 |
| 6,118,624 A * | 9/2000 | Fukuzawa et al. .......... 360/113 |
| 6,181,532 B1 * | 1/2001 | Dovek et al. .............. 360/321 |

* cited by examiner

Primary Examiner—Edward Lefkowitz
Assistant Examiner—Reena Aurora
(74) Attorney, Agent, or Firm—Irell & Manella, LLP; Jeffrey P. Aiello

(57) ABSTRACT

A method to test an instability of a magneto-resistive (MR) head. The instability is tested by first writing a signal onto a track. The junctions of the MR head are aligned with various track edges and the head characteristics are then measured. The characteristics may include determining a maximum amplitude covarian and a maximum base line popping noise.

9 Claims, 5 Drawing Sheets

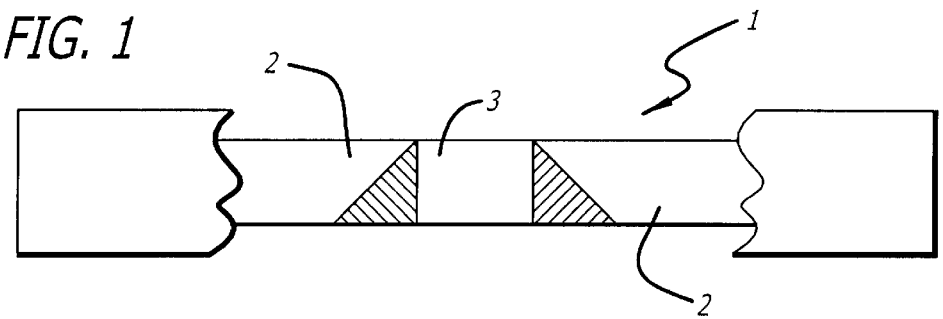
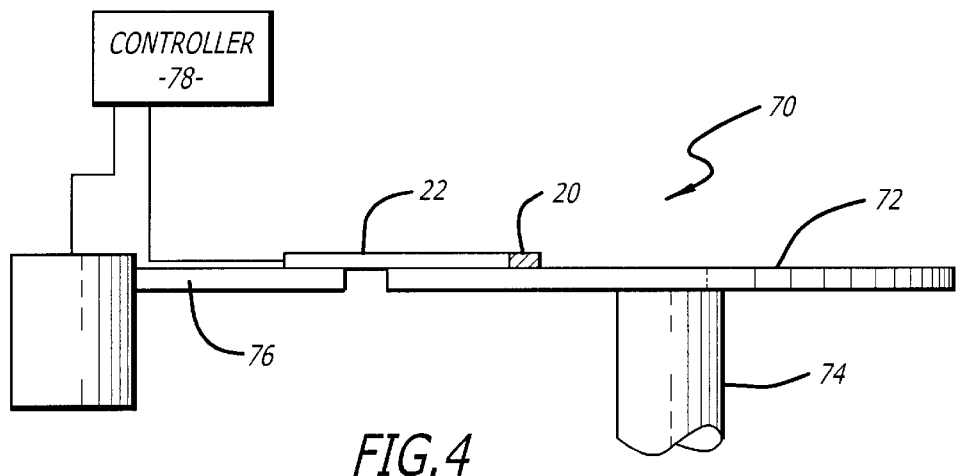
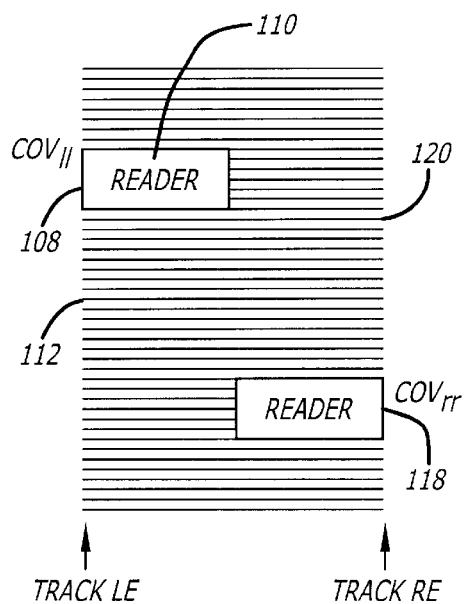
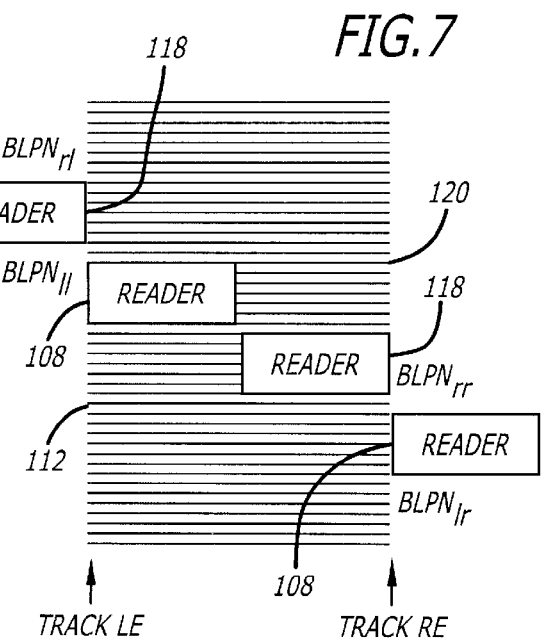

METHOD TO DETECT JUNCTION INDUCED SIGNAL INSTABILITY FROM GMR/MR HEADS

BACKGROUND OF THE INVENTION

1. Field of the Invention

The present invention provides a method for measuring different characteristics of a magneto-resistive head for a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

FIG. 1 shows an MR head 1 which has an abut junction design. This type of MR head has a pair of permanent magnets 2 located on either side of a sensor element 3. The permanent magnets provide a hard bias field that stabilize the sensor element 3.

Magnetic heads are typically tested before being assembled into disk drives. Errors in the manufacturing processes may create instabilities in the biasing junction. The stability of the heads are typically tested to screen for defective parts. Stability factors such as amplitude covarian and base line popping noise are tested by loading a head onto a test stand and performing test routines. The test routines include the steps of writing a signal on a track and then reading the signal with the magneto-resistive read element of the head. The signal is typically read when the read element is aligned with the center of the track. Such a procedure does not test for junction effects and is generally not effective in determining an instability of the head.

BRIEF SUMMARY OF THE INVENTION

One embodiment of the present invention is a method for measuring a characteristic of a magnetic head of a hard disk drive. The method includes the step of writing a signal onto a track of a disk. The track has left and right track edges. The magnetic head is moved to align junction areas of the head with the track edges. The characteristic is then measured. These steps may be repeated to align various junction areas with track edges and to measure various characteristics of the head.

BRIEF DESCRIPTION OF THE DRAWINGS

FIG. 1 is a cross-sectional view of a magneto-resistive head;

FIG. 4 is an illustration showing a magnetic head being tested in a test station;

FIG. 5 is a schematic showing a test routine to test a maximum amplitude covarian of a magnetic head;

FIG. 7 is a schematic showing a test routine to test a maximum base line popping noise of a magnetic head; and, FIG. 8 is a flowchart showing the test routine of FIG. 7.

DETAILED DESCRIPTION OF THE PREFERRED EMBODIMENT

In general the present invention provides a method to test an instability of a magneto-resistive (MR) head. The instability is tested by first writing a signal onto a track. The junctions of the MR head are aligned with various track edges and the head characteristics are then measured. The characteristics may include determining a maximum amplitude covarian and a maximum base line popping noise.

Figure 2:
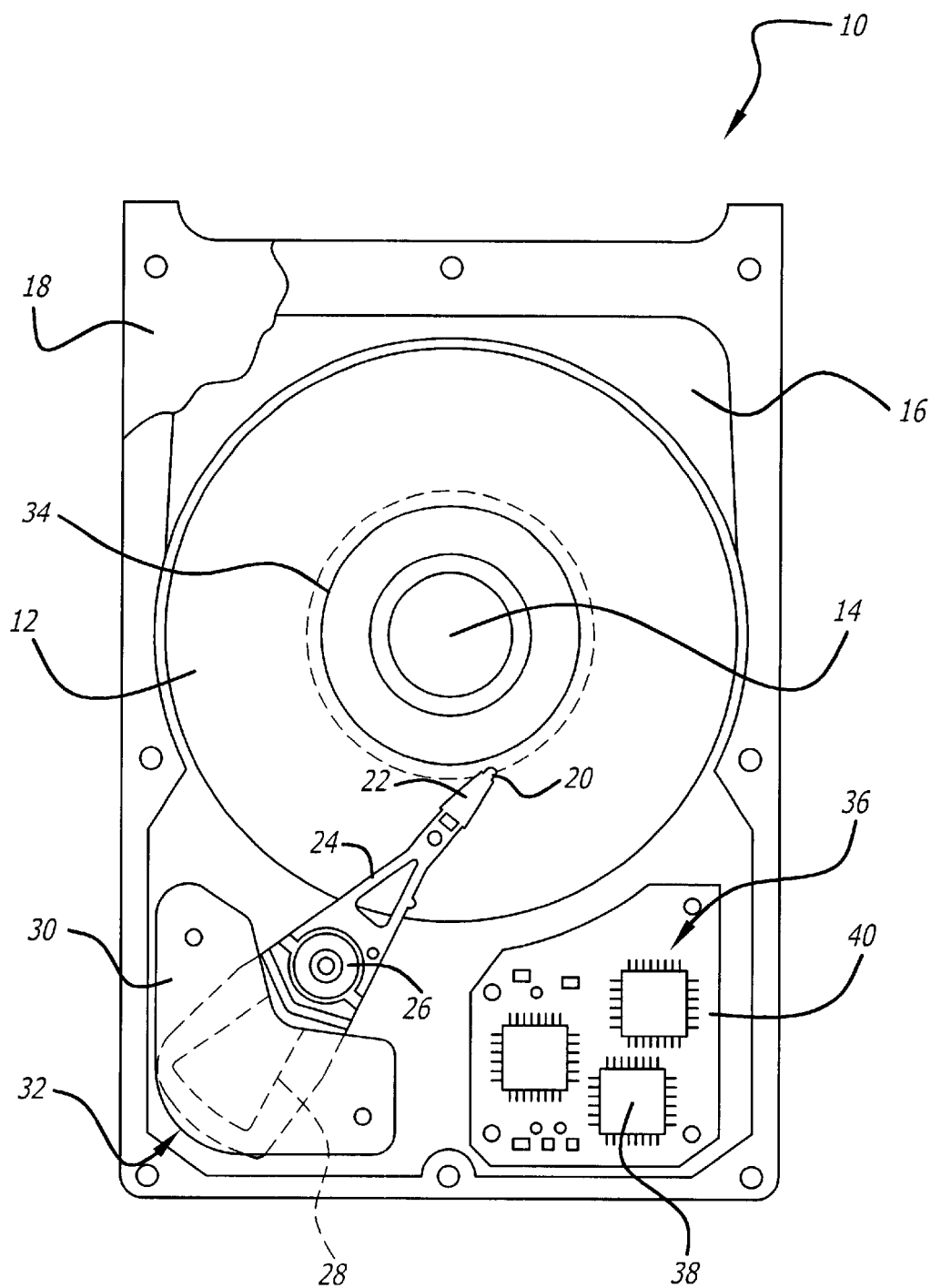
FIG. 2 is a top view of an embodiment of a hard disk drive of the present invention.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12. By way of example, the heads 20 may include magneto-resistive read elements and may be constructed the same or similar to the head 1 shown in FIG. 1.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

The voice coil motor 32 can move the heads 20 to a parking zone 34 of each disk 12. The parking zone 34 is an area that does not contain any data. The heads 20 are typically moved to the parking zones 20 when the disk drive 10 is powered down.

The hard disk drive 10 may include a printed circuit board assembly 36 that includes a plurality of integrated circuits 38 coupled to a printed circuit board 40. The printed circuit board 38 is coupled to the voice coil 28, heads 20 and spindle motor 14 by wires (not shown).

Figure 3:
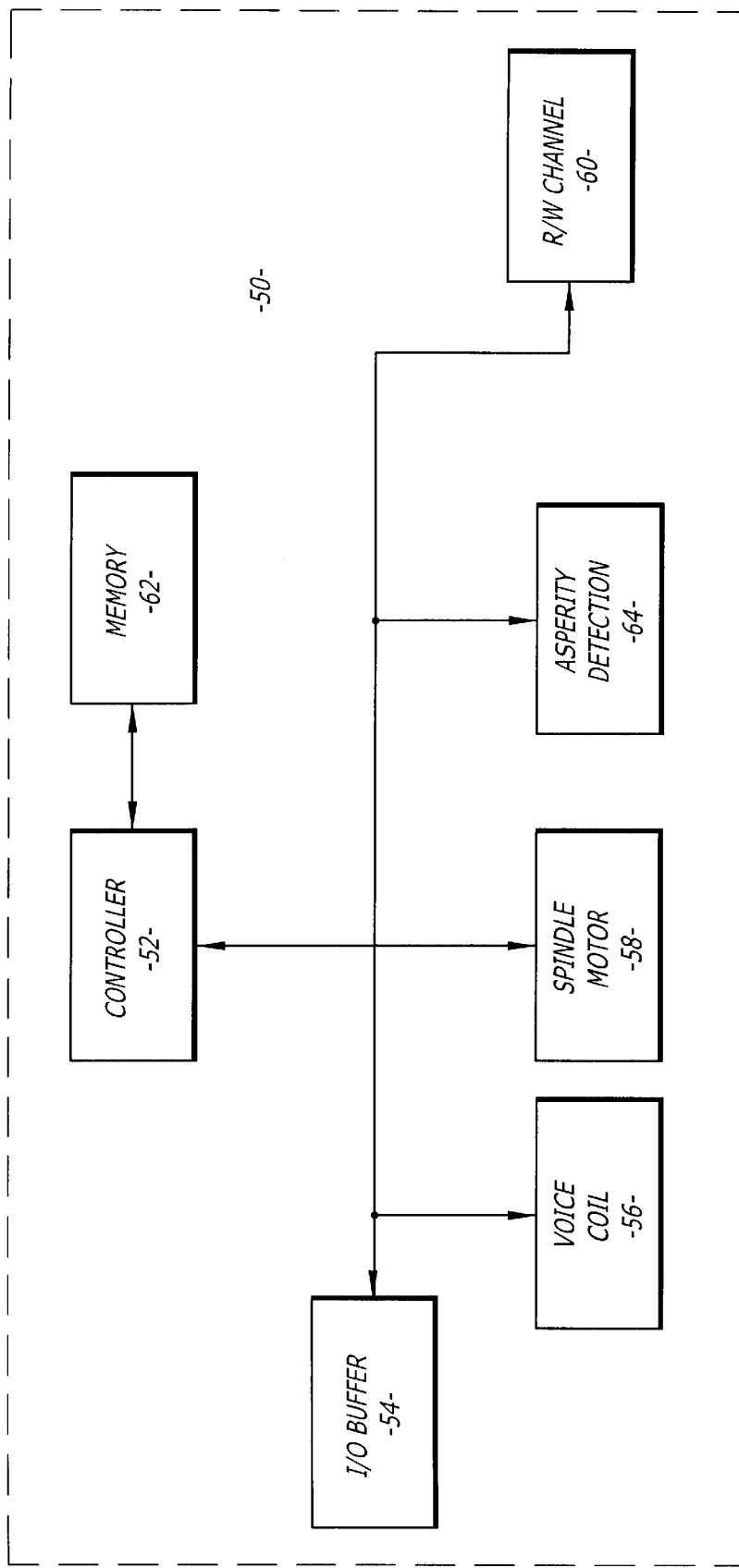
FIG. 3 is a schematic of an electrical system of the hard disk drive.

FIG. 3 shows a schematic of an electrical system 50 that can control the disk drive 10. The system 50 includes a controller 52 that is connected to an input/output (I/O) buffer 54, voice coil motor control circuit 56, spindle motor control circuit 58, read/write channel circuit 60, memory 62 and a thermal asperity detection circuit 64. The I/O buffer 54 provides an interface with an external source such as a personal computer. The voice coil control circuit 56 and spindle motor control circuit 58 contain drivers, etc. to control the voice coil motor and spindle motor, respectively. The voice coil motor circuit 56 and spindle motor control circuit 58 operate in accordance with signals, commands, etc. from the controller 52.

The controller 52 may be a processor that can perform software routines in accordance with instructions and data. Memory 62 may include both volatile and non-volatile memory. The thermal asperity circuit 64 can detect an asperity on the disks 12. The thermal asperity circuit 64 can provide an output signal, command, etc. to the controller 52 when an asperity is detected. Additionally, the thermal asperity circuit 64 may provide the output signal, command, etc. to the I/O buffer 54 for transmission to an external device such as a test station.

FIG. 4 shows a head 20 being tested in a test station 70. The head 20 may be mounted to the flexure arm 22 as part of a head gimbal assembly. The test station 70 includes a test disk 72 that is rotated by a spindle stand 74. The head 20 is loaded onto a loader arm 76. The loader arm 76 typically has a mechanism that can load and unload the head 20 onto the disk 72. The magnetic head 20 is electrically coupled to a controller circuit(s) 78 that can drive and sense output signals from the head 20.

Figure 6:
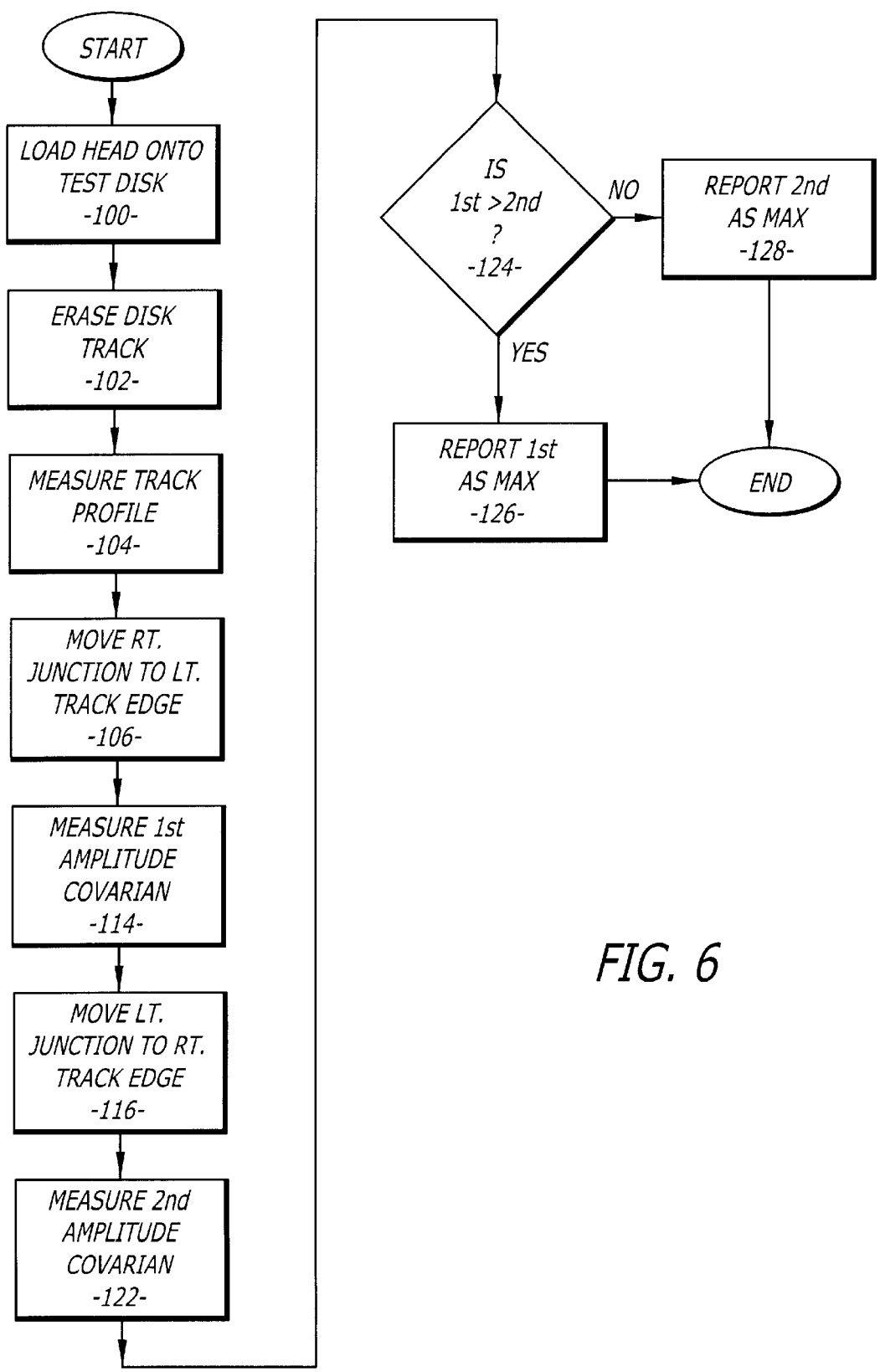
FIG. 6 is a flowchart showing the test routine of FIG. 5.

FIGS. 5 and 6 describe and show a test to determine a maximum amplitude covarian (COV) of a head 20. The head 20 is loaded onto the loader arm 76 and moved adjacent to the test disk 72 as indicated in process block 100. This step may be bypassed if the head 20 is already loaded and adjacent to the disk 72. As indicated in block 102, the controller circuit 78 and head 20 then erase a track of the disk 72. In process block 104 the test station 70 measures a track profile to determine the track edges and calculates the width of the magnetic read element.

In process block 106, the magnetic head 20 is moved relative to the disk 72 so that the right junction area 108 of the read element 110 is aligned with the left track edge 112 as shown in FIG. 5. A first amplitude covarian is then measured and stored in memory as indicated in process block 114. In process block 116, the left junction area 118 is moved adjacent to the right track edge 120. A second amplitude covarian is then measured and stored in memory as indicated in block 122. The maximum amplitude covarian is then determined in decision block 124 and reported in either blocks 126 or 128.

Figure 8:
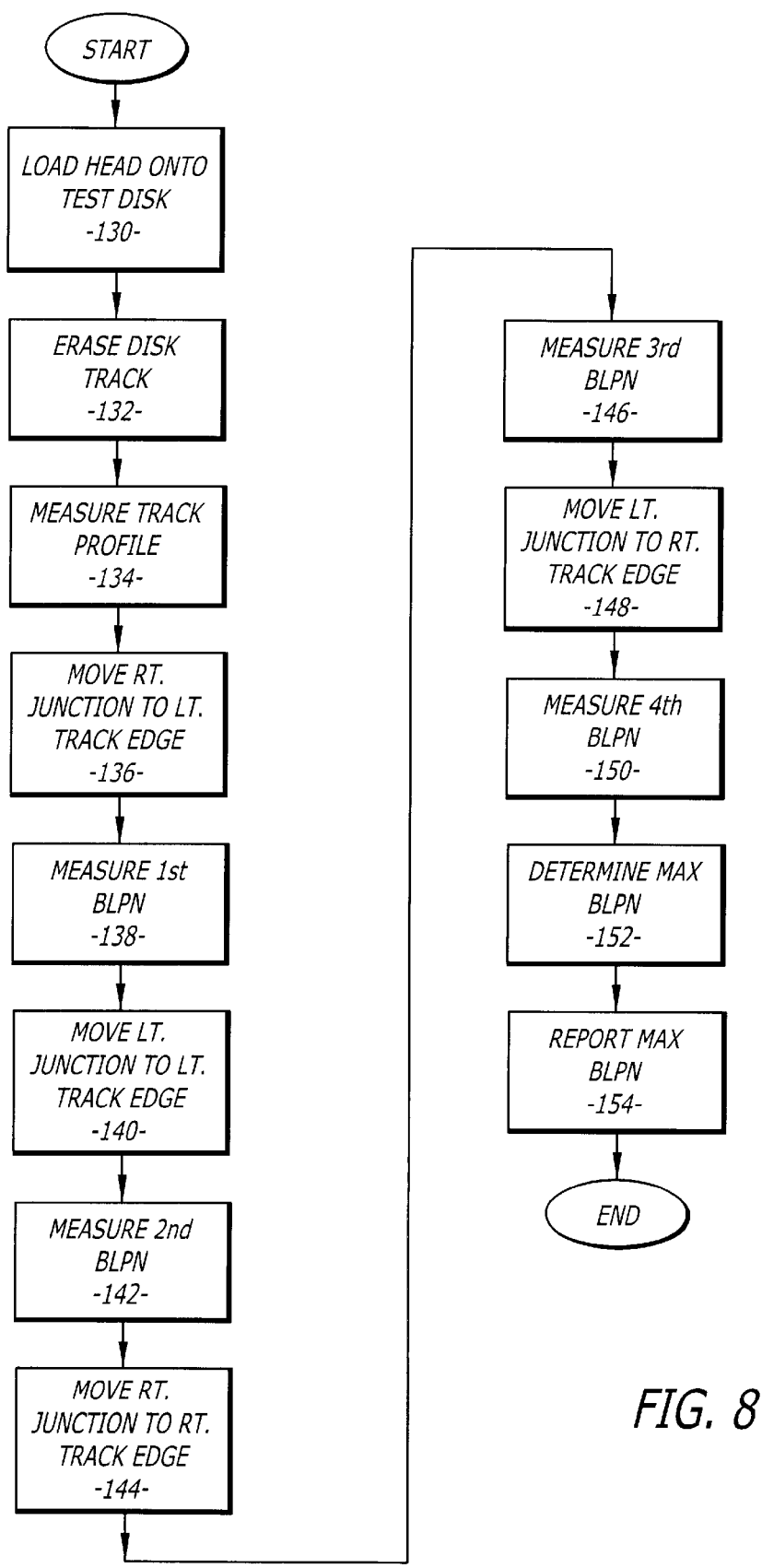

FIGS. 7 and 8, discuss and show a method for determining a maximum base line popping noise (BLPN). The head 20 is loaded onto the loader arm 76 and moved adjacent to the test disk 72 as indicated in process block 130. This step may be bypassed if the head 20 is already loaded onto the disk 72. As indicated in block 132, the controller circuit 78 and head 20 then erase a track of the disk 72. In process block 134 the test station 70 measures the track profile and calculates the widths of the magnetic writer and reader. Steps 132 and 134 can also be bypassed if these characteristics are determined in blocks 102 and 104.

In process block 136, the magnetic head 20 is moved relative to the disk 72 so that the right junction area 118 is aligned with the left track edge 120. A first base line popping noise is then measured and stored in memory as indicated in process block 138. In process block 140, the left junction area 108 is moved adjacent to the left track edge 112. A second base line popping noise is then measured and stored in memory as indicated in block 142. In process block 144, the right junction area 108 is moved adjacent to the right track edge 112. A third base line popping noise is then measured and stored in memory as indicated in block 146. In process block 148, the left junction area 118 is moved adjacent to the right track edge 112. A fourth base line popping noise is then measured and stored in memory as indicated in block 150. The maximum base line popping noise is then determined in block 152 and reported in block 154.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for testing a magnetic recording head of a hard disk drive, comprising:

writing a track onto a disk, the track having a left track edge and right track edge;

measuring a profile of the track;

moving a magnetic head so that a right junction area of the magnetic head is aligned with the left track edge;

measuring a first amplitude covarian of a signal provided by the magnetic head;

moving the magnetic head so that a left junction area of the magnetic head is aligned with the right track edge; and, measuring a second amplitude covarian of the signal provided by the magnetic head.

2. The method of claim 1, further comprising determining the maximum measured amplitude covarian.

3. The method of claim 2, further comprising reporting the maximum measured amplitude covarian.

4. The method of claim 1, wherein the magnetic head includes a magneto-resistive read element.

5. A method for testing a magnetic head of a hard disk drive, comprising:

writing a track on a disk, the track having a left track edge and a right track edge;

measuring a track profile;

moving a magnetic head so that a right junction area of the magnetic head is adjacent to the left track edge;

measuring a first noise in a signal provided by the magnetic head;

moving the magnetic head so that a left junction area of the magnetic head is adjacent to the left track edge;

measuring a second noise in the signal provided by the magnetic head;

moving the magnetic head so that the right junction area is aligned with the right track edge;

measuring a third noise in the signal provided by the magnetic head;

moving the magnetic head so that the left junction area is aligned with the right track edge; and, measuring a fourth noise in the signal provided by the magnetic head.

6. The method of claim 5, further comprising determining the maximum measured noise.

7. The method of claim 6, further comprising reporting the maximum measured noise.

8. The method of claim 5, wherein the noise is a base line popping noise.

9. The method of claim 5, wherein the magnetic head has a magneto-resistive read element.

\* \* \* \* \*